(12) United States Patent  
Du

(10) Patent No.: US 9,137,195 B2  
(45) Date of Patent: Sep. 15, 2015

(54) METHOD, NETWORK DEVICE AND USER EQUIPMENT FOR SWITCHING MEDIA ACCESS CONTROL ADDRESS

(71) Applicant: Huawei Technologies Co., LTD, Shenzhen (CN)

(72) Inventor: Feng Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 14/106,181

(22) Filed: Dec. 13, 2013

(65) Prior Publication Data

US 2014/0105599 A1    Apr. 17, 2014

Related U.S. Application Data

(63) Continuation of application No. PCT/CN2012/077026, filed on Jun. 15, 2012.

(30) Foreign Application Priority Data

Jun. 15, 2011 (CN) .......................... 2011 1 0160915

(51) Int. Cl.
*H04L 29/12* (2006.01)
*H04L 12/721* (2013.01)
*H04L 12/707* (2013.01)
(Continued)

(52) U.S. Cl.
CPC .......... *H04L 61/20* (2013.01); *H04B 10/25752* (2013.01); *H04L 45/22* (2013.01); *H04L 45/28* (2013.01); *H04L 45/62* (2013.01); *H04Q 11/0067* (2013.01); *H04L 61/2038* (2013.01); *H04L 61/6022* (2013.01); *H04Q 2011/0081* (2013.01)

(58) Field of Classification Search
None
See application file for complete search history.

(56) References Cited

U.S. PATENT DOCUMENTS

2003/0190168 A1* 10/2003 Song et al. ................... 398/168
2009/0067835 A1    3/2009 Chen
(Continued)

FOREIGN PATENT DOCUMENTS

CN    101667865 A    3/2010
CN    101834668 A    9/2010
(Continued)

OTHER PUBLICATIONS

International Search Report and Written Opinion received in Application No. PCT/CN2012/077026 mailed Aug. 23, 2012, 15 pages.
(Continued)

*Primary Examiner* — Brandon Renner
(74) *Attorney, Agent, or Firm* — Slater & Matsil, L.L.P.

(57) ABSTRACT

The present invention provides a method, a network device, and a user equipment for switching a MAC address. The network device provides a first port and a second port, each port being connected to at least one user equipment. After switching from the first port to the second port, the network device sends a first packet to the user equipment. The first packet carries a second MAC address, so that the user equipment switches a first MAC address to the second MAC address according to the first packet; receiving a second packet returned by the user equipment. After determining, according to the second packet, that the user equipment switches to the second MAC address, the locally used first MAC address is switched to the second MAC address.

17 Claims, 6 Drawing Sheets

(51) Int. Cl.
*H04L 12/703* (2013.01)
*H04B 10/2575* (2013.01)
*H04Q 11/00* (2006.01)

(56) References Cited

U.S. PATENT DOCUMENTS

| | | | |
|---|---|---|---|
| 2009/0219900 A1* | 9/2009 | Kokkinen et al. | 370/338 |
| 2010/0098407 A1 | 4/2010 | Goswami et al. | |
| 2010/0260040 A1* | 10/2010 | Wu | 370/223 |
| 2011/0228669 A1* | 9/2011 | Lei et al. | 370/219 |
| 2012/0127854 A1* | 5/2012 | Khetan et al. | 370/218 |
| 2012/0148230 A1* | 6/2012 | Dai et al. | 398/5 |
| 2013/0107872 A1* | 5/2013 | Lovett et al. | 370/352 |

FOREIGN PATENT DOCUMENTS

| | | |
|---|---|---|
| CN | 101867392 A | 10/2010 |
| CN | 102209037 A | 10/2011 |
| GB | 2448711 A | 10/2008 |
| WO | 2004038979 A2 | 5/2004 |

OTHER PUBLICATIONS

Vainshtein, A. et al., "Structure-Aware Time Division Multiplexed (TDM) Circuit Emulation Service over Packet Switched Network (CESoPSN)," Network Working Group, Overture Networks, Dec. 2007, 76 pages.

Vainshtein, A. et al., "Structure-Agnostic Time Division Multiplexing (TDM) over Packet (SAToP)," Network Working Group, RAD Data Communications, Jun. 2006, 54 pages.

\* cited by examiner

METHOD, NETWORK DEVICE AND USER EQUIPMENT FOR SWITCHING MEDIA ACCESS CONTROL ADDRESS

This application is a continuation of International Application No. PCT/CN2012/077026, filed on Jun. 15, 2012, which claims priority to Chinese Patent Application No. 201110160915.5, filed on Jun. 15, 2011, both of which are hereby incorporated by reference in their entireties.

TECHNICAL FIELD

Embodiments of the present invention relate to the field of communications technologies, and in particular, to a method, a network device, and a user equipment for switching a media access control address.

BACKGROUND

The basic idea of a circuit emulation service over packet (CESoP for short) is to establish a channel on a packet-switched network, where time division multiplexing (TDM for short) circuit (such as T1 or E1) transmission is implemented over the channel.

Specifically, a typical application of CESoP service transmission is as follows. A cellular backhaul unit (CBU for short) accesses an E1 service, encapsulates the E1 service according to the CESoP packet format, and transmits the packet to an optical line termination (OLT for short) device over a passive optical network (PON for short). The OLT device parses the CESoP service to obtain the E1 service, puts the E1 service into a synchronous digital hierarchy (SDH for short) frame according to configuration, and transmits the frame by using a synchronous transfer mode-1 (STM-1 for short) interface.

In actual networking, to improve reliability, the OLT device provides two ports, that is, one active port and one standby port. When the active port or the board where the active port resides is faulty, the OLT device automatically switches to the standby port and continues to work.

During CESoP service transmission, a sending device and a receiving device need to configure a media access control (MAC for short) address of the peer end for CESoP service use. For example, in the above typical application, the MAC address of the OLT device needs to be configured on the CBU. When switching from the active port to the standby port, the OLT device usually uses the MAC address of the active port as the current MAC address for CESoP service transmission. This causes a problem that, when the active port is faulty or replaced, if the MAC address of the active port is still used and is configured on the CBU, MAC address conflict may occur, further causing service interruption.

SUMMARY OF THE INVENTION

Embodiments of the present invention provides a method, a network device, and a user equipment for switching a MAC address, which solve the MAC conflict problem caused by service switching, automatically complete MAC address switching after the network device switches from a first port to a second port, and avoid packet loss in the process of MAC address switching and need no additional packet and processing.

An embodiment of the present invention provides a method for switching a MAC address, where a network device provides a first port and a second port, and each port is connected to at least one user equipment. The method includes after switching from the first port to the second port, sending, by the network device, a first packet to the user equipment, where the first packet carries a second MAC address, so that the user equipment switches a first MAC address to the second MAC address according to the first packet, where the first MAC address is a MAC address used by the network device on the first port, and the second MAC address is a MAC address used by the network device on the second port, and receiving a second packet returned by the user equipment, and after determining, according to the second packet, that the user equipment switches to the second MAC address, switching the locally used first MAC address to the second MAC address.

An embodiment of the present invention provides another method for switching a MAC address. The method includes receiving a first packet sent by a network device, where the first packet carries a second MAC address, according to the first packet, switching a first MAC address to the second MAC address, where the first MAC address is a MAC address used by the network device on a first port, and the second MAC address is a MAC address used by the network device on a second port, and returning a second packet to the network device.

An embodiment of the present invention provides a network device. The network device provides a first port and a second port, and each port is connected to at least one user equipment. The network device includes a first sending module, configured to send a first packet to the user equipment after the network device switches from the first port to the second port, where the first packet carries a second MAC address, so that the user equipment switches a first MAC address to the second MAC address according to the first packet, where the first MAC address is a MAC address used by the network device on the first port, and the second MAC address is a MAC address used by the network device on the second port, a first receiving module, configured to receive a second packet returned by the user equipment, and a first switching module, configured to, after determining, according to the second packet received by the first receiving module, that the user equipment switches to the second MAC address, switch the locally used first MAC address to the second MAC address.

An embodiment of the present invention provides a user equipment, including a second receiving module, configured to receive a first packet sent by a network device, where the first packet carries a second MAC address, a second switching module, configured to switch a first MAC address to the second MAC address according to the first packet, where the first MAC address is a MAC address used by the network device on a first port, and the second MAC address is a MAC address used by the network device on a second port, and a third sending module, configured to send a second packet to the network device after the second switching module switches the first MAC address to the second MAC address.

An embodiment of the present invention provides a network system, including a network device and a user equipment, where the network device provides a first port and a second port and each port is connected to at least one user equipment.

The network device is configured to: send a first packet to the user equipment after the network device switches from the first port to the second port, where the first packet carries a second MAC address, so that the user equipment switches a first MAC address to the second MAC address according to the first packet, where the first MAC address is a MAC address used by the network device on the first port, and the second MAC address is a MAC address used by the network device on the second port; receive a second packet returned by the user equipment; and after determining, according to the second packet, that the user equipment switches to the second MAC address, switch the locally used first MAC address to the second MAC address.

The user equipment is configured to: receive the first packet sent by the network device, where the first packet carries the second MAC address; switch the first MAC address to the second MAC address according to the first packet; and return the second packet to the network device.

According to embodiments of the present invention, after switching from the first port to the second port, the network device sends the second MAC address used on the second port to the user equipment by carrying it in the first packet, receives the second packet returned by the user equipment, and after the network device determines, according to the second packet, that the user equipment switches to the second MAC address, switches the locally used first MAC address to the second MAC address. This solves the MAC conflict problem caused by service switching, and automatically completes MAC address switching after the network device switches from the first port to the second port, thereby avoiding packet loss in the process of MAC address switching and needing no additional packet and processing.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages in the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
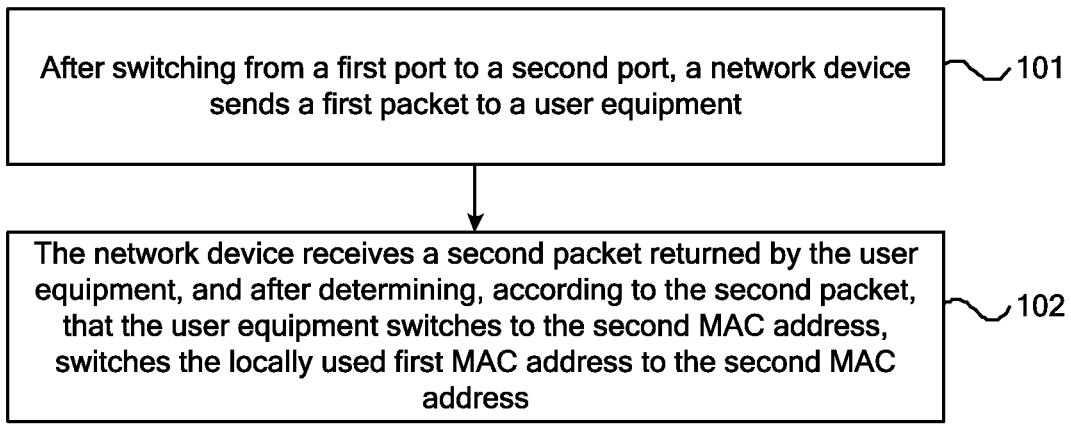
FIG. 1 is a flowchart of a method for switching a MAC address according to an embodiment of the present invention.

FIG. 1 is a flowchart of a method for switching a MAC address according to an embodiment of the present invention. As shown in FIG. 1, the method for switching a MAC address may include the following steps.

Step 101: After switching from a first port to a second port, a network device sends a first packet to a user equipment, where the first packet carries a second MAC address, so that the user equipment switches a first MAC address to the second MAC address according to the first packet, where the first MAC address is a MAC address used by the network device on the first port, and the second MAC address is a MAC address used by the network device on the second port.

Step 102: The network device receives a second packet returned by the user equipment, and after determining, according to the second packet, that the user equipment switches to the second MAC address, switches the locally used first MAC address to the second MAC address.

In this embodiment, the network device provides a first port and a second port, and each port is connected to at least one user equipment.

The first packet and/or the second packet in this embodiment may be a CESoP packet.

Specifically, in step 101, sending a first packet, which carries a second MAC address, to the user equipment may be as follows: The network device carries the second MAC address to a real-time transport protocol (RTP) sequence number field of the first packet, and sends the first packet to the user equipment.

Further, in the above embodiment, in step 101, after the network device switches from the first port to the second port, the network device may send a third packet to the user equipment before the network device sends the first packet to the user equipment, where the third packet carries a MAC address switching notification, and the MAC address switching notification is carried in an RTP sequence number field of the third packet. The third packet in this embodiment may be a CESoP packet. The first packet and the third packet may be the same CESoP packet or may be different CESoP packets.

In the above embodiment, after switching from the first port to the second port, the network device sends the second MAC address used on the second port by the network device to the user equipment by carrying it in the first packet, receives the second packet returned by the user equipment; and after determining, according to the second packet, that the user equipment switches to the second MAC address, switches the locally used first MAC address to the second MAC address. This solves the MAC conflict problem caused by service switching, and automatically completes MAC address switching after the network device switches from the first port to the second port, thereby avoiding packet loss in the process of MAC address switching and needing no additional packet and processing.

Figure 2:
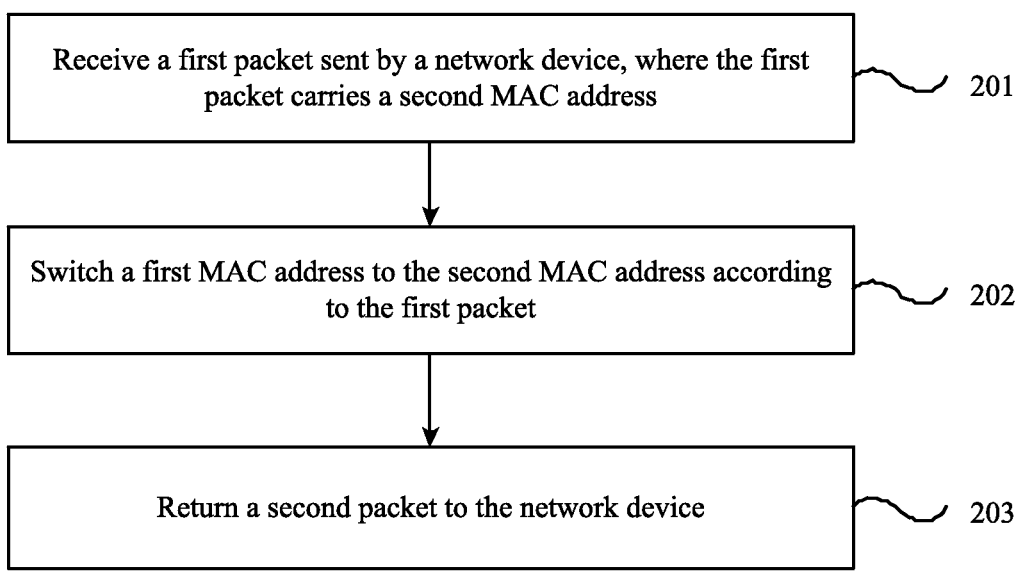
FIG. 2 is a flowchart of a method for switching a MAC address according to another embodiment of the present invention.

FIG. 2 is a flowchart of a method for switching a MAC address according to another embodiment of the present invention. As shown in FIG. 2, the method for switching a MAC address may include the following steps.

Step 201: Receive a first packet sent by a network device, where the first packet carries a second MAC address.

Step 202: According to the first packet, switch a first MAC address to the second MAC address, where the first MAC address is a MAC address used by the network device on a first port, and the second MAC address is a MAC address used by the network device on a second port.

Step 203: Return a second packet to the network device.

In this embodiment, the first packet and/or the second packet may be a CESoP packet.

Further, in this embodiment, before step 201, a user equipment may receive a third packet sent by the network device, where the third packet carries a MAC address switching notification, the MAC address switching notification is carried in an RTP sequence number field of the third packet. The third packet in this embodiment may be a CESoP packet.

In the above embodiment, after receiving the first packet which carries the second MAC address and is sent by the network device, the user equipment switches the first MAC address to the second MAC address and returns the second packet to the network device. This solves the MAC conflict problem caused by service switching, and automatically completes MAC address switching after the network device switches from the first port to the second port, thereby avoiding packet loss in the process of MAC address switching and needing no additional packet and processing.

It should be noted that in the embodiments shown in FIG. 1 and FIG. 2, "first packet," "second packet," and "third packet" are only used to differentiate different CESoP packets, and do not indicate a priority or an execution sequence, which are applicable in the following. The first packet and the third packet may be the same CESoP packet, and the CESoP packet is used to carry the second MAC address after switching and the MAC address switching notification. Alternatively, the first packet and the third packet may be different CESoP packets, that is, the MAC address switching notification is carried in one CESoP packet and the second MAC address after switching is carried in the other CESoP packet.

Figure 3:
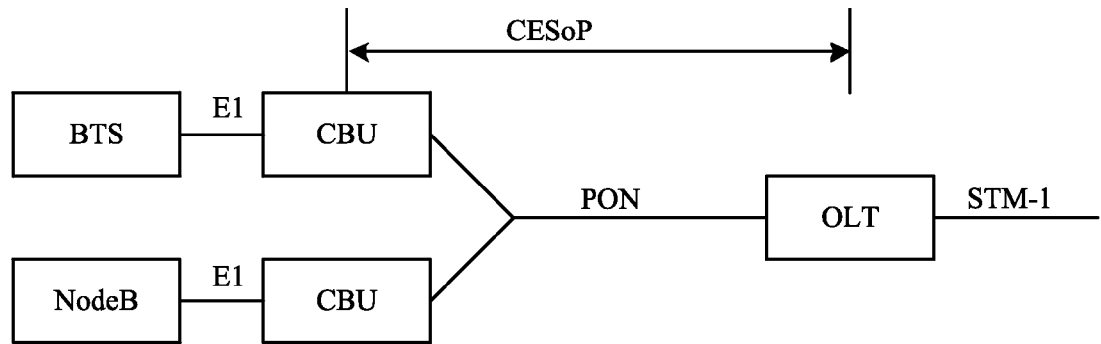
FIG. 3 is a schematic diagram of an application scenario according to an embodiment of the present invention.

The method for switching a MAC address provided in the embodiments of the present invention shown in FIG. 1 and FIG. 2 may be applied in an application scenario shown in FIG. 3. FIG. 3 is a schematic diagram of an application scenario according to an embodiment of the present invention, and in FIG. 3, a CBU is a user equipment and an OLT device is a network device.

Figure 4:
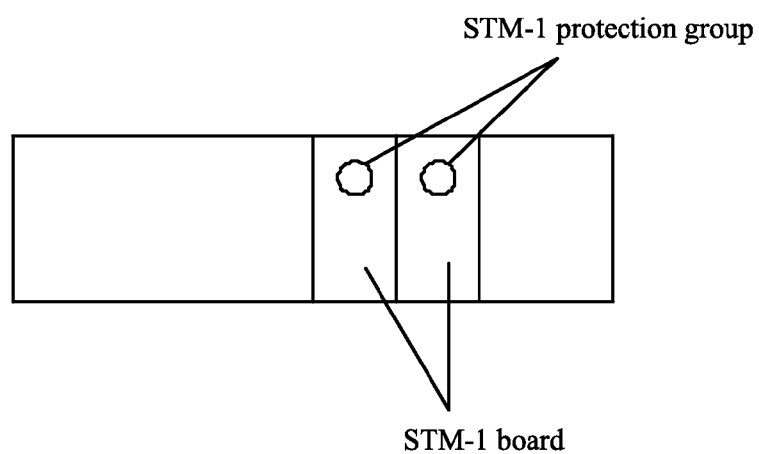
FIG. 4 is a schematic diagram of an STM board on an OLT device according to an embodiment of the present invention.

As shown in FIG. 3, the CBU completes E1 access, that is, the CBU connects to a base transceiver station (BTS) and a NodeB (NodeB) by connecting to an E1 interface. Then, the CBU may encapsulate an E1 service according to a CESoP packet format, transmits it to the OLT device over a PON. The OLT device parses the CESoP packet to obtain the E1 service, puts the E1 service into an SDH frame according to configuration, and outputs it through an STM-1 interface. As shown in FIG. 4, in actual networking, the OLT device may use two STM-1 boards, to improve reliability. Each STM-1 board has an STM-1 port. The two STM-1 ports are configured to be an STM-1 protection group. There are two ports in the STM-1 protection group, that is, a first port and a second port, where the first port is used as an active port, and the second port is used as a standby port. When the active port or the board where the active port resides is faulty, the OLT switches from the active port to the standby port, and sends a CESoP packet to the user equipment, where the second MAC address after switching is carried in the packet, so that the CBU switches the first MAC address to the second MAC address according to the packet. The first MAC address is a MAC address used by the OLT on the active port, and the second MAC address is a MAC address used by the OLT on the standby port. After receiving a packet which acknowledges the success of MAC address switching and is sent by the CBU, the OLT uses the second MAC address as the MAC address of the STM-1 protection group, so that after service switching, the process of automatic MAC address switching is completed.

For TDM services, E1 and T1 services are two kinds of TDM services, and E1 and T1 are two kinds of standard interfaces in TDM. An E1 service is carried over an E1 interface, and a T1 service is carried over a T1 interface. The method in the above embodiment is also applicable to a scenario where a user-side interface is a T1 interface, that is, a T1 service scenario.

FIG. 4 is a schematic diagram of an STM board on an OLT device according to an embodiment of the present invention. The OLT device generally uses two STM-1 boards, and each STM-1 board has an STM-1 port. The two STM-1 ports may be configured to be an STM-1 protection group. There are two ports in the STM-1 protection group, that is, an active port and a standby port. When the active port or the board where the active port resides is faulty, the OLT device may use the MAC address of the standby port as the MAC address of the STM-1 protection group according to the above method for switching a MAC address, so that the MAC address after switching is configured on the CBU and MAC address switching is automatically completed. In this way, the OLT device can continue to work on the standby port. This solves the MAC address conflict problem caused by service switching, and avoids packet loss in the process of MAC address switching and needing no additional packet and processing. The method for switching a MAC address provided in the present invention is described in detail with reference to the specific embodiments in the following.

Figure 5:
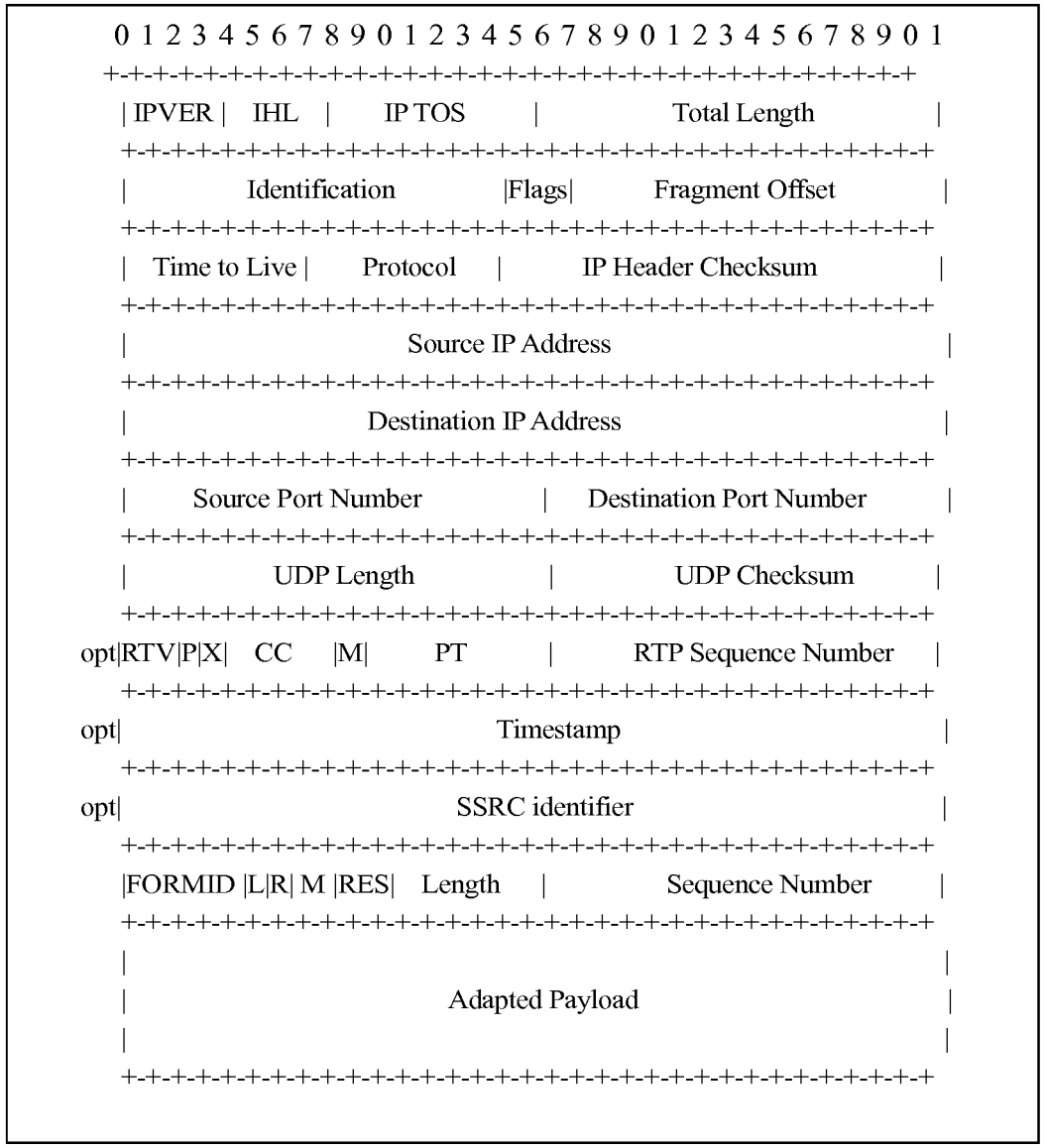
FIG. 5 is a schematic diagram of a CESoP packet format according to an embodiment of the present invention.
Figure 6:
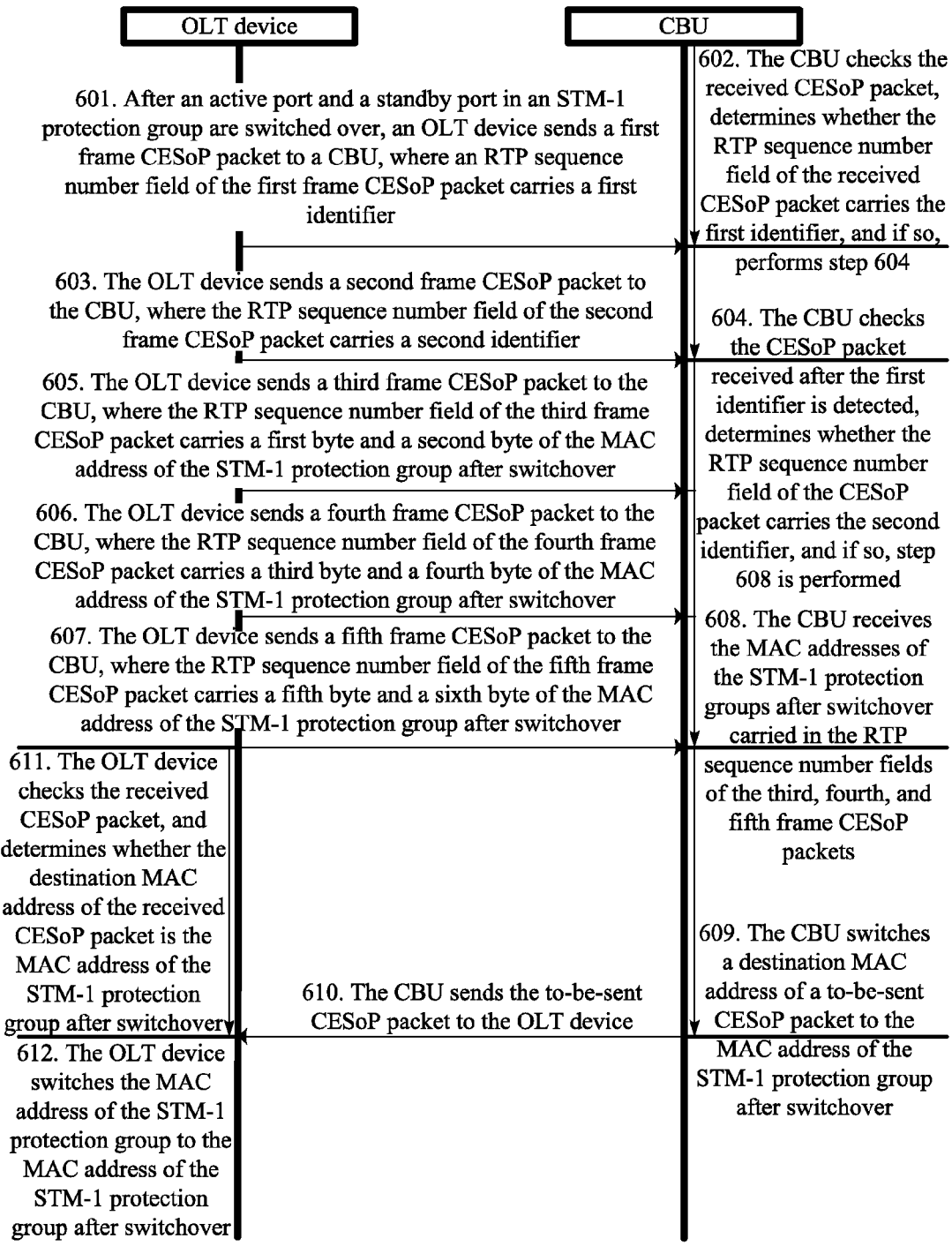
FIG. 6 is a flowchart of a method for switching a MAC address according to still another embodiment of the present invention.

FIG. 5 is a schematic diagram of a CESoP packet format according to an embodiment of the present invention. As shown in FIG. 5, the packet format includes a source port number, a destination port number, a source IP address, and a destination IP address. In a CESoP packet format specified in a standard, SN is specified by a sequence number field. The MAC address of the OLT device after switching provided in the embodiment of the present invention may be carried in an RTP sequence number field. The length of the RTP sequence number field is 16 bits. In addition, according to the embodiment of the present invention, the RTP sequence number field of the CESoP packet may be used to transmit a MAC address switching notification. Further, the MAC address after switching may be carried in the RTP sequence number field of the CESoP packet or may be carried in another field of the CESoP packet, and the main purpose is to send the MAC address after switching to the user equipment by carrying it in the CESoP packet, so that the user equipment can switch the MAC address in time, and it is ensured that after the OLT device switches the port, the OLT device can continue to communicate with the CBU by using the MAC address after switching. FIG. 6 is a flowchart of a method for switching a MAC address according to still another embodiment of the present invention. The method for switching a MAC address provided in this embodiment may also be applied to application scenarios shown in FIG. 3 and FIG. 4. In this embodiment, an example that a user equipment is a CBU, a network device is an OLT device, a first port is an active port in an STM-1 protection group, and a second port is a standby port in the STM-1 protection group is taken for description.

As shown in FIG. 6, the method for switching a MAC address may include.

Step 601: After an active port and a standby port in an STM-1 protection group are switched over, an OLT device sends a first frame CESoP packet to a CBU, where an RTP sequence number field of the first frame CESoP packet carries a first identifier.

This embodiment uses an example that the first identifier is 0 for description. However, the embodiment is not limited thereto. The first identifier may be set to be any positive integer, any character or any string, or may be set to be a combination of any two or three of the following: a positive integer, a character, and a string. This embodiment does not limit the setting manner of the first identifier.

Step 602: The CBU checks the received CESoP packet, determines whether the RTP sequence number field of the received CESoP packet carries the first identifier, and if so, step 604 is performed.

In this embodiment, if the CBU determines that the RTP sequence number field of the received CESoP packet does not carry the first identifier, the CBU continues to parse a subsequently received CESoP packet to obtain the first identifier.

Step 603: The OLT device sends a second frame CESoP packet to the CBU, where the RTP sequence number field of the second frame CESoP packet carries a second identifier.

This embodiment uses an example that the second identifier is 0xFFFF for description. However, the embodiment is not limited thereto. The second identifier may be set to be any positive integer, any character or any string, or may be set to be a combination of any two or three of the following: a positive integer, a character, and a string. This embodiment does not limit the setting manner of the second identifier.

Step 604: The CBU checks the CESoP packet received after the first identifier is detected, determines whether the RTP sequence number field of the CESoP packet carries the second identifier, and if so, step 608 is performed.

In this embodiment, if the CBU determines that the CESoP packet received after the first identifier is detected does not carry the second identifier in the RTP sequence number field, the CBU continues to parse a subsequently received CESoP packet to obtain the second identifier.

Steps 601 to 604 are optional, in which the OLT device instructs, through the CESoP packet, the user equipment CBU to perform MAC address switching, and after the CBU receives the CESoP packet, the CBU prepares, according to the packet, to receive the MAC address after switching. The identifier in the RTP sequence number field in steps 601 to 604 may be negotiated and determined by the OLT device and an optical network unit (ONU for short) in advance.

Step 605: The OLT device sends a third frame CESoP packet to the CBU, where the RTP sequence number field of the third frame CESoP packet carries a first byte and a second byte of the MAC address of the STM-1 protection group after switchover.

Step 606: The OLT device sends a fourth frame CESoP packet to the CBU, where the RTP sequence number field of the fourth frame CESoP packet carries a third byte and a fourth byte of the MAC address of the STM-1 protection group after switchover.

Step 607: The OLT device sends a fifth frame CESoP packet to the CBU, where the RTP sequence number field of the fifth frame CESoP packet carries a fifth byte and a sixth byte of the MAC address of the STM-1 protection group after switchover.

In steps 605 to 607, the OLT device sends a CESoP packet, which carries a MAC address, to the CBU. Because a MAC address is usually 48 bits, and the RTP sequence number field may carry two bytes of a MAC address each time, the MAC address of the STM-1 protection group after switchover is sent to the CBU in three times according to the number of bytes allowed to be carried in the RTP sequence number field. Further, the number of times in which a MAC address is sent by the OLT device to the CBU depends on the number of bytes of a MAC address allowed to be carried in a field of a CESoP packet and is not limited to three times. Further, before receiving a MAC address, the CBU may pre-negotiate with the OLT device to determine the sequence of receiving the MAC address, for example, the two bytes received first are high order bits of the MAC byte, and a specific receiving manner is not limited thereto as long as the CBU negotiates or determines it with the OLT device in advance.

Step 608: The CBU receives the MAC addresses of the STM-1 protection groups after switchover carried in the RTP sequence number fields of the third, fourth, and fifth frame CESoP packets.

Step 609: The CBU switches a destination MAC address of a to-be-sent CESoP packet to the MAC address of the STM-1 protection group after switchover.

Step 610: The CBU sends the to-be-sent CESoP packet to the OLT device.

Step 611: The OLT device checks the received CESoP packet, determines whether the destination MAC address of the received CESoP packet is the MAC address of the STM-1 protection group after switchover, and if so, step 612 is performed.

If the OLT device determines that the destination MAC address of the received CESoP packet is not the MAC address of the STM-1 protection group after switchover, the OLT device resends the first frame CESoP packet and continues to check the destination MAC address of a received CESoP packet until the OLT device determines that the destination MAC address of the received CESoP packet is the MAC address of the STM-1 protection group after switchover.

Step 612: The OLT device switches the MAC address of the STM-1 protection group to the MAC address of the STM-1 protection group after switchover.

In the above embodiment, after the active port and standby port in the STM-1 protection group are switched over, the OLT device sends the MAC address of the STM-1 protection group after switchover to the CBU by carrying it in a CESoP packet, and after determining that the destination MAC address in the CESoP packet sent by the CBU is switched to the MAC address of the STM-1 protection group after switchover, switches the MAC address of the STM-1 protection group to the MAC address of the STM-1 protection group after switchover. In this way, MAC address switching is automatically completed after the active port and standby port in the STM-1 protection group are switched over, thereby avoiding packet loss in the process of MAC address switching and needing no additional packet and processing.

Persons of ordinary skill in the art should understand that all or part of the steps of the method embodiments may be implemented by a program instructing relevant hardware. The program may be stored in a computer readable storage medium. When the program runs, the program executes the steps of the method embodiments. The storage medium may be any medium capable of storing program codes, such as a ROM, a RAM, a magnetic disk, or a CD-ROM.

Figure 7:
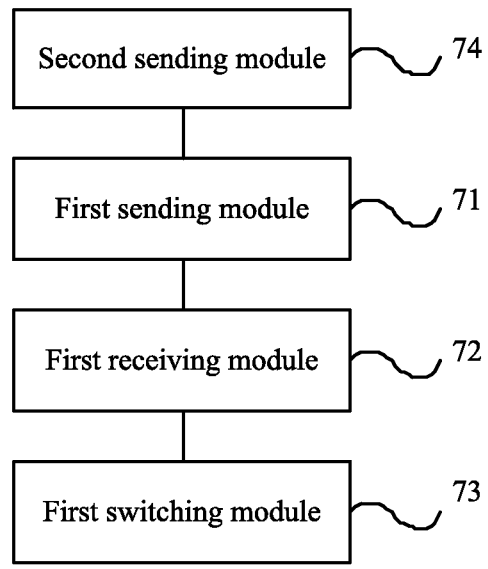
FIG. 7 is a schematic structural diagram of a network device according to an embodiment of the present invention.

FIG. 7 is a schematic structural diagram of a network device according to an embodiment of the present invention. The network device in this embodiment may implement the process in the embodiment shown in FIG. 1 according to the present invention. As shown in FIG. 7, the network device may include a first sending module 71, configured to send a first packet to a user equipment after the network device switches from a first port to a second port, where the first packet carries a second MAC address, so that the user equipment switches a first MAC address to the second MAC address according to the first packet, where the first MAC address is a MAC address used by the network device on the first port, and the second MAC address is a MAC address used by the network device on the second port, a first receiving module 72, configured to receive a second packet returned by the user equipment, and a first switching module 73, configured to, after determining, according to the second packet received by the first receiving module 72, that the user equipment switches to the second MAC address, switch the locally used first MAC address to the second MAC address.

The first packet and/or the second packet in this embodiment may be a CESoP packet.

Further, according to an implementation manner of this embodiment, the network device may further include a second sending module 74, connected to the first sending module 71, and configured to send a third packet to the user equipment, where the third packet carries a MAC address switching notification, where the MAC address switching notification is carried in an RTP sequence number field of the third packet. The first packet and the third packet may be the same CESoP packet, that is, the second MAC address in the first packet and the MAC address switching notification are carried in the same CESoP packet. Or, the first packet and the third packet may be different CESoP packets, that is, the second MAC address and the MAC address switching notification are carried in different CESoP packets.

The above network device may be an OLT device.

In the above embodiment, after the network device switches from the first port to the second port, the first sending module 71 sends the second MAC address used on the second port by the first sending module 71 to the user equipment by carrying it in the first packet, the first receiving module 72 receives the second packet returned by the user equipment, and after it is determined, according to the second packet, that the user equipment switches to the second MAC address, the first switching module 73 switches the locally used first MAC address to the second MAC address. In this way, MAC address switching is automatically completed after the network device switches from the first port to the second port, thereby avoiding packet loss in the process of MAC address switching and needing no additional packet and processing.

Figure 8:
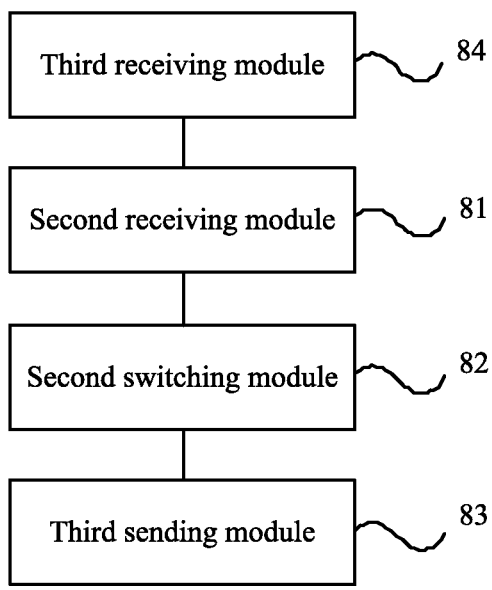
FIG. 8 is a schematic structural diagram of a user equipment according to an embodiment of the present invention.

FIG. 8 is a schematic structural diagram of a user equipment according to an embodiment of the present invention. The user equipment in this embodiment may implement the process in the embodiment shown in FIG. 2 according to the present invention. As shown in FIG. 8, the user equipment may include a second receiving module 81, configured to receive a first packet sent by a network device, where the first packet carries a second MAC address, a second switching module 82, configured to switch a first MAC address to the second MAC address according to the first packet, where the first MAC address is a MAC address used by the network device on a first port, and the second MAC address is a MAC address used by the network device on a second port, and a third sending module 83, configured to send a second packet to the network device after the second switching module 82 switches the first MAC address to the second MAC address.

In this embodiment, the first packet and/or the second packet may be a CESoP packet.

Further, according to an implementation manner of this embodiment, the user equipment may further include a third receiving module 84, connected to the second receiving module 81, configured to receive a third packet sent by the network device, where the third packet carries a MAC address switching notification, and the MAC address switching notification is carried in an RTP sequence number field of the third packet. The first packet and the third packet may be the same CESoP packet, that is, the second MAC address and the MAC address switching notification are carried in the same CESoP packet. Or, the first packet and the third packet may be different CESoP packets, that is, the second MAC address and the MAC address switching notification are carried in different CESoP packets.

The above user equipment may be a CBU, or an ONU, or an optical network terminal (ONT for short).

In the above embodiment, after the second receiving module 81 receives a first packet which carries the second MAC address and is sent by the network device, the second switching module 82 switches the first MAC address to the second MAC address, and then the third sending module 83 returns the second packet to the network device. In this way, MAC address switching is automatically completed after the network device switches from the first port to the second port, thereby avoiding packet loss in the process of MAC address switching and needing no additional packet and processing.

Figure 9:
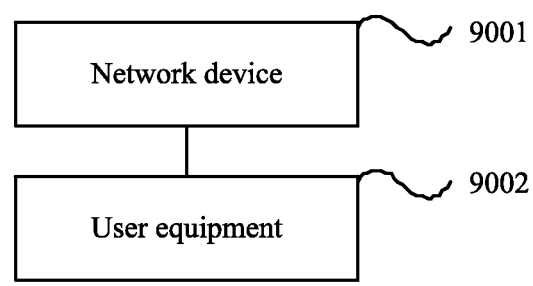
FIG. 9 is a schematic structural diagram of a network system according to an embodiment of the present invention.

FIG. 9 is a schematic structural diagram of a network system according to an embodiment of the present invention. As shown in FIG. 9, the network system may include a network device 9001 and a user equipment 9002. The network device 9001 provides a first port and a second port, and each port is connected to at least one user equipment 9002.

The network device 9001 is configured to: send a first packet to the user equipment 9002 after the network device 9001 switches from the first port to the second port, where the first packet carries a second MAC address, so that the user equipment 9002 switches a first MAC address to the second MAC address according to the first packet, where the first MAC address is a MAC addresses used by the network device 9001 on the first port and the second MAC address is a MAC addresses used by the network device 9001 on the second port; receive a second packet returned by the user equipment 9002; and after determining, according to the second packet, that the user equipment 9002 switches to the second MAC address, switch the locally used first MAC address to the second MAC address.

The user equipment 9002 is configured to: receive the first packet sent by the network device 9001, where the first packet carries the second MAC address; switch the first MAC address to the second MAC address according to the first packet; and return the second packet to the network device 9001.

The first packet and/or the second packet in this embodiment may be a CESoP packet.

In this embodiment, the network device 9001 may further send a third packet to the user equipment 9002, where the third packet carries a MAC address switching notification, where the MAC address switching notification is carried in an RTP sequence number field of the third packet.

The user equipment 9002 may further receive the third packet sent by the network device 9001, where the third packet carries the MAC address switching notification, where the MAC address switching notification is carried in an RTP sequence number field of the third packet.

For the schematic structural diagram of the networking of the above network device and the user equipment, reference may be made to FIG. 3; for the schematic structural diagrams of the network device and the user equipment, reference may be made to FIG. 7 and FIG. 8, and details are not repeated herein.

The above embodiments automatically complete MAC address switching after the active port and standby port in the STM-1 protection group are switched over, thereby avoiding packet loss in the process of MAC address switching and needing no additional packet and processing.

Persons skilled in the art may understood that the accompanying drawings are merely schematic diagrams of exemplary embodiments, and modules or processes in the accompanying drawings are not necessarily required for implementing the present invention.

Persons skilled in the art may understand that the modules in the apparatuses provided in the embodiments may be distributed in the apparatuses according to the description of the embodiments, or be correspondingly changed to be disposed in one or more apparatuses different from the embodiments. The modules in each of the foregoing embodiments may be combined into one module, or split into a plurality of sub-modules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; without departing from the idea and scope of the technical solutions of the embodiments of the present invention.

What is claimed is:

1. A method for switching a media access control (MAC) address, wherein a network device provides a first port and a second port and each port is connected to at least one user equipment, the method comprising:
    after the network device switches from the first port to the second port, sending, by the network device, a first packet to a user equipment, wherein the first packet carries a second MAC address so that the user equipment switches a first MAC address to the second MAC address according to the first packet, wherein the first MAC address is a MAC address used by the network device on the first port and the second MAC address is a MAC address used by the network device on the second port;
    receiving a second packet returned by the user equipment;
    determining, according to the second packet, that the user equipment switches to the second MAC address; and
    switching a locally used first MAC address to the second MAC address.

2. The method according to claim 1, wherein the first packet is a packet of circuit emulation service over packet.

3. The method according to claim 2, wherein the second packet is a packet of circuit emulation service over packet.

4. The method according to claim 1, wherein the second packet is a packet of circuit emulation service over packet.

5. The method according to claim 1, wherein sending the first packet to the user equipment, comprises:
    carrying the second MAC address in a real-time transport protocol sequence number field of the first packet; and
    sending the first packet to the user equipment.

6. The method according to claim 1, wherein after the network device switches from the first port to the second port and before the network device sends the first packet to the user equipment, the method further comprises:
    sending a third packet to the user equipment, wherein the third packet carries a MAC address switching notification that is carried in a real-time transport protocol sequence number field of the third packet.

7. A network device that provides a first port and a second port, each port being connected to at least one user equipment, the network device comprising:
    a first sending module, configured to send a first packet to the user equipment after the network device switches from the first port to the second port, wherein the first packet carries a second media access control (MAC) address, so that the user equipment switches a first MAC address to the second MAC address according to the first packet, wherein the first MAC address is a MAC address used by the network device on the first port and the second MAC address is a MAC address used by the network device on the second port;
    a first receiving module, configured to receive a second packet returned by the user equipment; and
    a first switching module, configured to, after determining, according to the second packet received by the first receiving module, that the user equipment switches to the second MAC address, switch a locally used first MAC address to the second MAC address.

8. The network device according to claim 7, wherein the first packet and/or the second packet is a packet of circuit emulation service over packet.

9. The network device according to claim 7, wherein the network device further comprises:
    a second sending module connected to the first sending module and configured to send a third packet to the user equipment, wherein the third packet carries a MAC address switching notification that is carried in a real-time transport protocol sequence number field of the third packet.

10. A user equipment, comprising:
    a receiving module, configured to receive a first packet sent by a network device, wherein the first packet carries a second MAC address;
    a switching module, configured to switch a first MAC address to the second MAC address according to the first packet, wherein the first MAC address is a MAC address used by the network device on a first port and the second MAC address is a MAC address used by the network device on a second port; and
    a sending module, configured to send a second packet to the network device after the switching module switches the first MAC address to the second MAC address.

11. The user equipment according to claim 10, wherein the first packet and/or the second packet is a packet of circuit emulation service over packet.

12. The user equipment according to claim 10, further comprising:
    a second receiving module connected to the sending module and configured to receive a third packet sent by the network device, wherein the third packet carries a MAC address switching notification that is carried in a real-time transport protocol sequence number field of the third packet.

13. A network system, comprising:
    a network device that provides a first port and a second port; and
    a user equipment;
    wherein the network device is configured to send a first packet to the user equipment after the network device switches from the first port to the second port, wherein the first packet carries a second media access control (MAC) address so that the user equipment switches a first MAC address to the second MAC address according to the first packet, wherein the first MAC address is a MAC address used by the network device on the first port, and the second MAC address is a MAC address used by the network device on the second port, the network device further configured to receive a second packet returned by the user equipment and, after determining, according to the second packet, that the user equipment switches to the second MAC address, switch a locally used first MAC address to the second MAC address; and
    wherein the user equipment is configured to receive the first packet sent by the network device and to switch the first MAC address to the second MAC address according to the first packet; and return the second packet to the network device.

14. The system according to claim 13, wherein the first packet and/or the second packet is a packet of circuit emulation service over packet.

15. The system according to claim 13, wherein the network device is further configured to send a third packet to the user equipment, wherein the third packet carries a MAC address switching notification that is carried in a real-time transport protocol sequence number field of the third packet.

16. The system according to claim 15, wherein the user equipment is further configured to receive the third packet sent by the network device.

17. The system according to claim 13, wherein the user equipment is further configured to receive a third packet sent by the network device, wherein the third packet carries a MAC address switching notification that is carried in a real-time transport protocol sequence number field of the third packet.

* * * * *